June 1, 1926.
H. R. FOWLER
COUPLING
Filed August 11, 1924
1,586,793
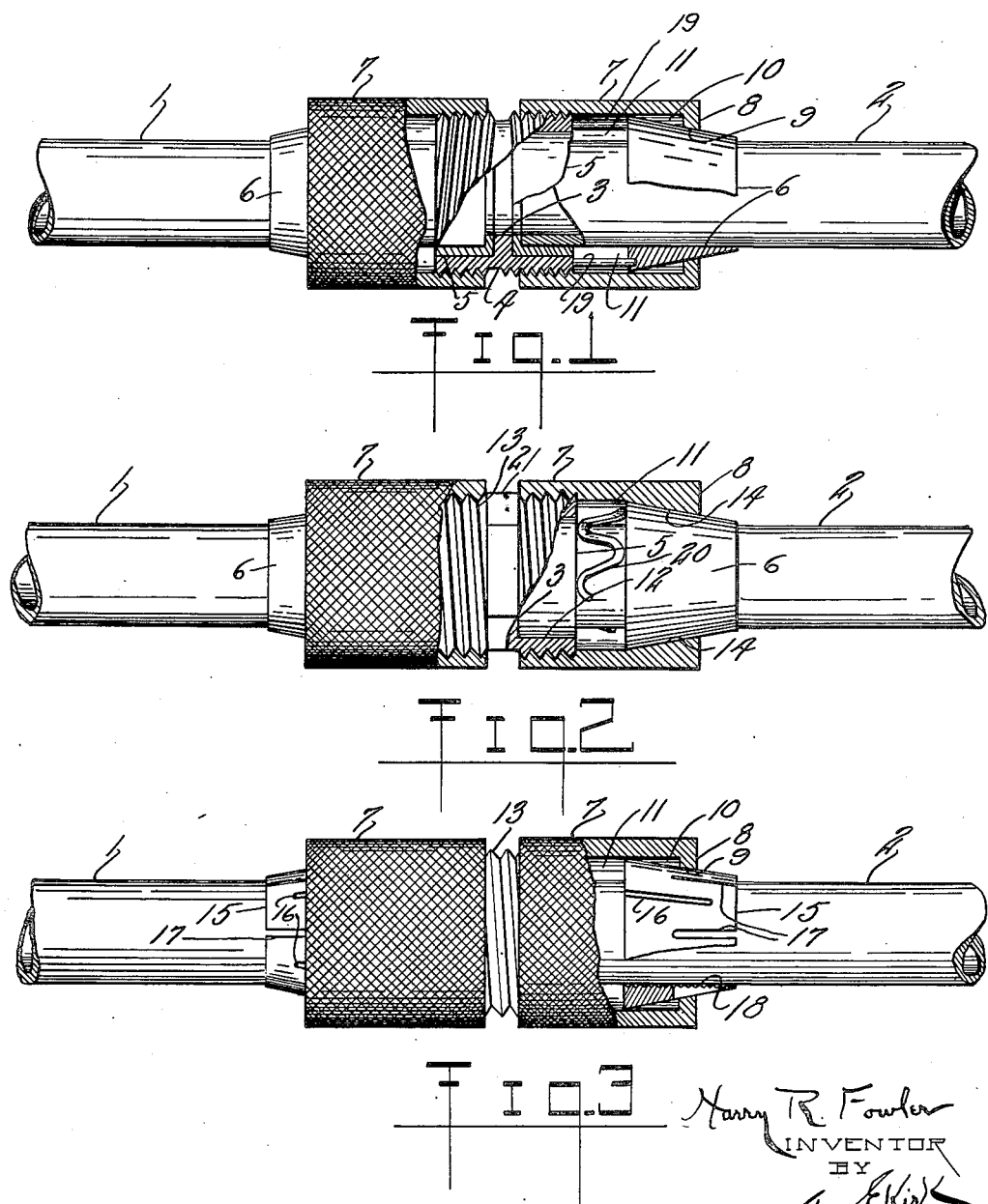

Patented June 1, 1926.

1,586,793

UNITED STATES PATENT OFFICE.

HARRY R. FOWLER, OF TOLEDO, OHIO.

COUPLING.

Application filed August 11, 1924. Serial No. 731,330.

This invention relates to couplings, more especially for tubes or pipes.

This invention has utility when incorporated in unions for effecting even liquid and gas tight assembling of pipe sections operable in conditions of tension or pressure.

Referring to the drawings:—

Fig. 1 is a side elevation of an embodiment of the invention as a union or coupling;

Fig. 2 is a view similar to Fig. 1, with the nut slightly changed as to its bevel face; and Fig. 3 is a view similar to Fig. 2, with a wedge member changed as to its collapsing structure.

Pipe or tubular member 1 as opposing tubular member 2 is spaced therefrom by shoulder 3 inwardly extending medially of central externally threaded sleeve 4. The shoulder 3 is spaced from the respective ends of the pipes 1, 2, by compressible gasket or packing 5, which is preferably of a metal such as lead or soft copper. Before these pipes or tubular members 1, 2, are brought into position with the sleeve 4 thereover, the respective pipes have wedge members 6 thereon with the enlarged diameter of the wedge toward the pipe ends or shoulder 3. Also, placed on these respective pipes 1, 2, with the larger diameter portions of the members 6 therein, are knurled faced nuts 7 internally threaded to engage the externally threaded portions of the sleeve 4. Each of these nuts 7 is shown as having inwardly extending offset 8 terminating in wedge face 9 leaving a void 10 inside the nut 7.

In operation, the nut 7 is shifted toward the member 4 and is held centered by the wedge 6. The position of the wedge 6 is such that as the nut 7 is rotated into engagement with the threaded portion of the sleeve 4, this wedge 6 as acted upon by the wedge face 9 serves as a clutching or gripping means in engaging the pipe. This gripping is frictional and may to an extent be supplemented by a collapsing of the wedge 6, say as made of a soft metal, as lead or an alloy.

As brought into gripping action this wedge 6 in the further travel of the nut 7 forces the pipe 1, or 2, toward the shoulder 3 for compressing the gasket 5. There is, herein, accordingly, a sealing packing of the pipe at the shoulder 3. The assembly or holding is between the threaded sleeve 4 and the nut 7, which holding is stiffened by the gripping action of the wedge 6 which may be a supplemental sealing with the threaded portion of the sleeve 4 in packing of air chamber 11 as an additional void in the coupling for insuring a doubly tight sealing of the device.

The wedge 6 for resistance of pressures may be of different angle of wedge or taper. Furthermore, the alloys or metal may be varied to give the frictional holding action and in this connection with a steel pipe a soft aluminum wedge has an effective gripping action. In practice this gripping action may be tested to have its factor of safety at least that of the pipe.

In Fig. 2, sleeve 12 is shown as having shoulder 3 spaced by packing or gasket 5 from the end of pipe 2. This sleeve 12 is shown as having a continuous thread 13 instead of right and left external thread as shown in Fig. 1. The nut 7 is shown as having an extended bevel face 14, thus eliminating the void 10 as shown in Fig. 1.

In instances where the double sealing is not important, a direct mechanical clutching is effected by providing wedge 15 (Fig. 3) which is preferably of a hard material as iron or steel. This wedge 15 is given its flexibility for clutching by oppositely extending kerfs 16, 17. Its gripping action upon the the pipes is a real biting-in by teeth or jaws 18.

It is, accordingly, seen that in the action of the invention hereof, which permits the use of tubular members independently of any threading thereof, the tubular members may be nicely cut to the desired length. The coupling herein disclosed may be assembled therewith and operates as a union for directly assembling the pipe or tubular member as an electrical conduit, gas, water, or steam line. The holding may be firm. The great advantage in use is not only the cutting to the length which may be definite, due to the slight compression in the gaskets 5, but the entire elimination of threading. The gaskets 5, as they are in practice of material tending to be readily distorted when exposed to rough usage, may be incorporated as a lining for the sleeve 4 in the instances where a fluid tight packed joint is desired. However in electrical conduit work, the ground connection through the joint of coupling is essential and such may be through the metallic lining or directly between the shoulder 3 and the pipe 2. Furthermore, there is the union advantage in that any section may be put in or taken out, or there may be working of employees toward each other in continuous line.

It is desirable that the wedge member 6 or 15 has a gripping or holding action at once the nut 7 starts to pull on the sleeve. This gripping or holding may directly take place, due to the internal configuration of the wedge member. Such gripping or holding is enhanced by the teeth or jaws 18 on the member 15. In those instances where this initial resistance for starting the collapsing of the wedge member does not occur or for insuring such occurrence, a yieldable or collapsible resistance may be introduced, as say soft pins 19 partially embedded in the member 6 for anchoring and extending to abut the end of the sleeve 4. These pins 19 insure such thrusting of the member 6 as to effect frictional binding of the member 6 upon the pipe 2 by the action of the wedge face 9.

Further pulling action of the nut 7 reducing the extent of the void 11 is not materially resisted by the pins 19 for such will collapse in this chamber 11. In lieu of the series of pins 19 there may be collapsible washer 20 in this chamber 11. In those instances where it is desired to insure rotation directly between the externally threaded member and the nut 7, the externally threaded member may be provided with a polygonal portion 21 for engagement by a wrench.

What is claimed and it is desired to secure by Letters Patent is:

A pipe or conduit coupling comprising, in combination, an externally threaded sleeve member provided with an inwardly extending shoulder, a pipe having its end abutting said shoulder, a demountable wedge collar surrounding the pipe and spaced from said sleeve member, a collapsible member intermediate said wedge collar and sleeve end, adapted to provide a yielding abutment therebetween, and a clamping nut threaded on said sleeve member and having an internal wedge surface to engage the wedge collar to grip said pipe radially, collapse said intermediate member and shift said pipe longitudinally into positive engagement with said shoulder when said nut is tightened.

In witness whereof I affix my signature.

HARRY R. FOWLER.